United States Patent
Becker et al.

(10) Patent No.: US 9,392,012 B2
(45) Date of Patent: Jul. 12, 2016

(54) APPLICATION SECURITY TESTING SYSTEM

(71) Applicant: BANK OF AMERICA CORPORATION, Charlotte, NC (US)

(72) Inventors: Matthew S. Becker, Charlotte, NC (US); Gideon Thomas Rasmussen, Tega Cay, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 279 days.

(21) Appl. No.: 14/070,067

(22) Filed: Nov. 1, 2013

(65) Prior Publication Data
US 2015/0128279 A1    May 7, 2015

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *H04L 29/06* | (2006.01) |

(52) U.S. Cl.
CPC ................................. *H04L 63/1433* (2013.01)

(58) Field of Classification Search
CPC ............ H04L 63/1433; H04L 63/1416; H04L 63/1441; G06F 21/577; G06F 11/3668; G06F 11/36; G06F 2221/033; G06Q 10/0635; G06Q 10/04
See application file for complete search history.

(56) References Cited

U.S. PATENT DOCUMENTS

| | | | | |
|---|---|---|---|---|
| 2006/0265751 A1* | 11/2006 | Cosquer | .............. | H04L 63/1441 726/25 |
| 2012/0203590 A1* | 8/2012 | Deb | ................... | G06Q 10/0635 705/7.28 |
| 2013/0191919 A1* | 7/2013 | Basavapatna | ......... | G06F 21/577 726/25 |

* cited by examiner

*Primary Examiner* — Michael S McNally
*Assistant Examiner* — Trong Nguyen
(74) *Attorney, Agent, or Firm* — Michael A. Springs; Moore and Van Allen PLLC; W. Kevin Ransom

(57) ABSTRACT

Embodiments of the invention are directed to an apparatus, method, and computer program product for an exposure based application security testing system. In some embodiments, the apparatus is configured to: access an application, wherein the application comprises an assessment parameter, wherein the assessment parameter comprises one or more assessment sub-parameters, wherein the one or more assessment sub-parameters comprise one or more assessment indicators; process the application, wherein processing the application comprises calculating a total exposure score for the application based on at least an application exposure score and a protective control score; determine whether the application qualifies for security testing based on at least the calculated total exposure score; and initiating the presentation of the qualified application to the user to implement security testing.

15 Claims, 7 Drawing Sheets

| PARAMETER | SUB-PARAMETERS | EXPOSURE SCORE |
|---|---|---|
| PARAMETER 1 | SUB-PARAMETER 1.1 | ES1.1 |
| | SUB-PARAMETER 1.2 | ES1.2 |
| | SUB-PARAMETER 1.3 | ES1.3 |
| | | |
| PARAMETER 2 | SUB-PARAMETER 2.1 | ES2.1 |
| | SUB-PARAMETER 2.2 | ES2.2 |
| | SUB-PARAMETER 2.3 | ES2.3 |
| | SUB-PARAMETER 2.4 | ES2.4 |

$$\text{APPLICATION EXPOSURE SCORE} = \frac{\text{PARAMETER 1}}{3} + \frac{\text{PARAMETER 2}}{4}$$

$$\text{TOTAL EXPOSURE SCORE} = \text{APPLICATION EXPOSURE SCORE} + P$$

APPLICATION SECURITY TESTING SYSTEM

BACKGROUND

There is a need for a system to conduct an assessment based application security testing on applications.

BRIEF SUMMARY

Embodiments of the invention relate to apparatus, method, and computer program product for accessing an application, wherein the application comprises an assessment parameter, wherein the assessment parameter comprises one or more assessment sub-parameters, wherein the one or more assessment sub-parameters comprise one or more assessment indicators; processing the application, wherein processing the application comprises calculating a total exposure score for the application based on at least an application exposure score and a protective control score; determining whether the application qualifies for security testing based on at least the calculated total exposure score; and initiating the presentation of the qualified application to the user to implement security testing.

In some embodiments, the total exposure score is a summation of the application exposure score and the protective control score.

In some embodiments, calculating the protective control score is based on at least an existence of a protective security firewall to limit unauthorized use and access to the application.

In some embodiments, the module is further configured to: receive an input from the user, wherein the input from the user associates the one or more assessment indicators with an assessment parameter; map the input received from the user to a predetermined exposure score; and calculate the application exposure score based on at least mapping the input received from the user to the predetermined exposure score.

In some embodiments, calculating the application exposure score comprises summing the mapped score of the assessment parameter based on at least a normalization of the mapped score with the one or more sub-parameters associated with the assessment parameter.

In some embodiments, the input from the user associates the one or more assessment indicators with an assessment sub-parameter.

In some embodiments, the module is further configured to enable a user selection of the predetermined exposure score.

In some embodiments, a user selection of the predetermined exposure score is not unique to an assessment parameter.

In some embodiments, the user selection of the predetermined exposure score is not unique to an assessment sub-parameter.

In some embodiments, the user selection of the predetermined exposure score is unique to an assessment parameter.

In some embodiments, the user selection of the predetermined exposure score is unique to an assessment sub-parameter.

In some embodiments, module is further configured to: receive the total exposure score associated with the application; compare the total exposure score to a predetermined threshold score; determine whether the total exposure score is greater than the predetermined threshold score; and initiate the presentation of the one or more applications to the user to implement security testing based on at least determining whether the total exposure score is greater than the predetermined threshold score.

In some embodiments, the module is further configured to enable a user selection of the predetermined threshold score.

In some embodiments, the user selection of the predetermined threshold score is unique to the application.

In some embodiments, the user selection of the predetermined threshold score is not unique to the application.

In some embodiments, the module is further configured to: receive the total exposure score associated with one or more applications; sort the one or more applications based on at least the total exposure score; and initiate the presentation of the one or more applications to the user to implement security testing based on at least the sorted order of the one or more applications.

In some embodiments, the one or more applications are sorted in descending order based on at least the total exposure score.

In some embodiments, security testing is implemented on the one or more applications based on at least the descending order of the total exposure score.

In some embodiments, security testing is implemented on a subset of the one of more application based on at least the sorted order.

BRIEF DESCRIPTION OF THE FIGURES

Figure 1:
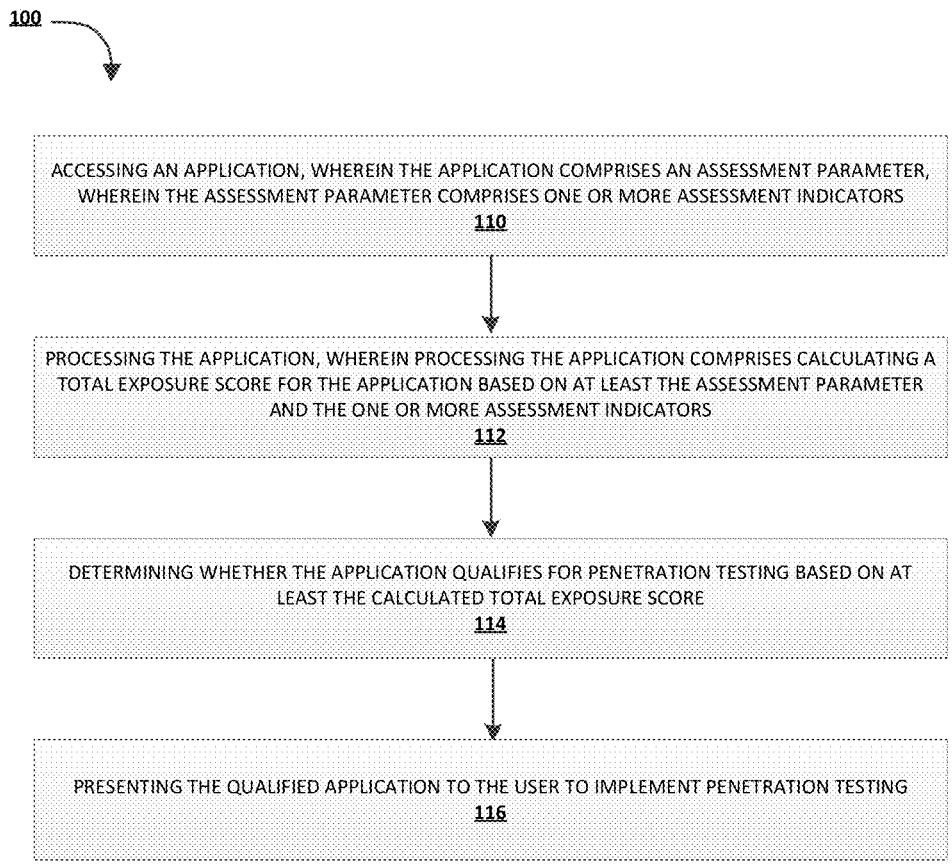
Figure 2:
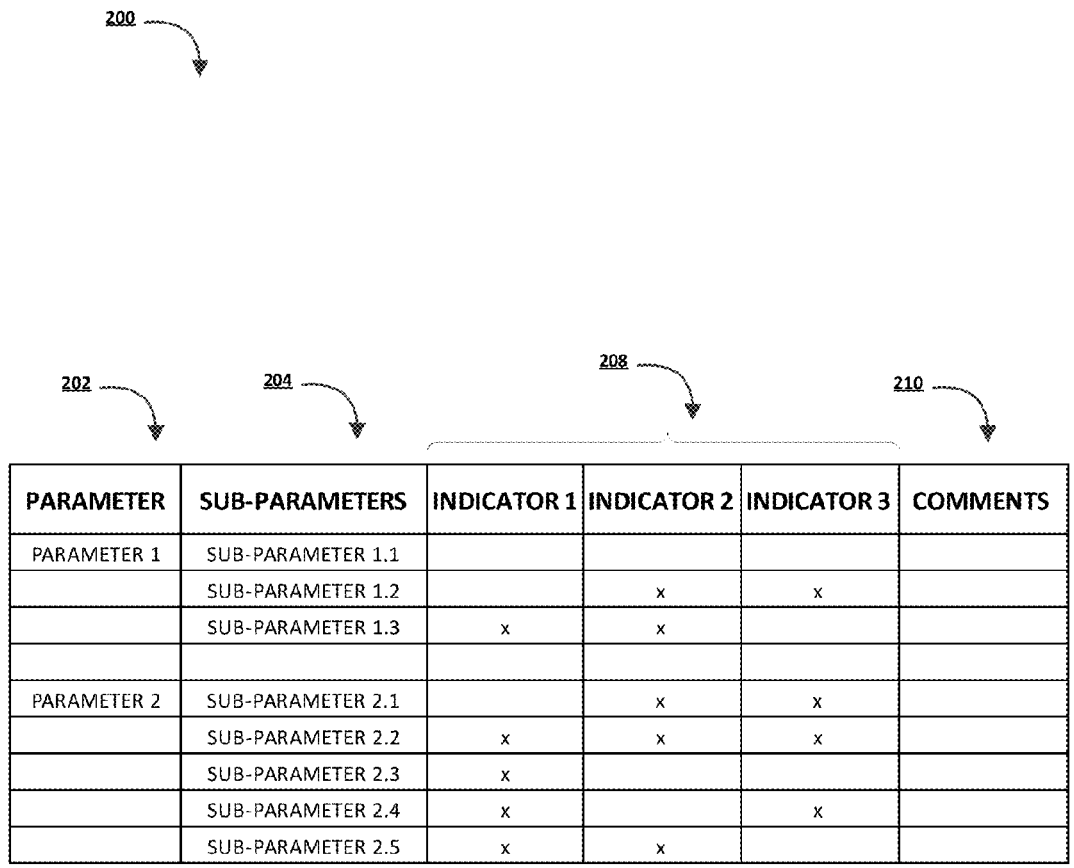
Figure 3:
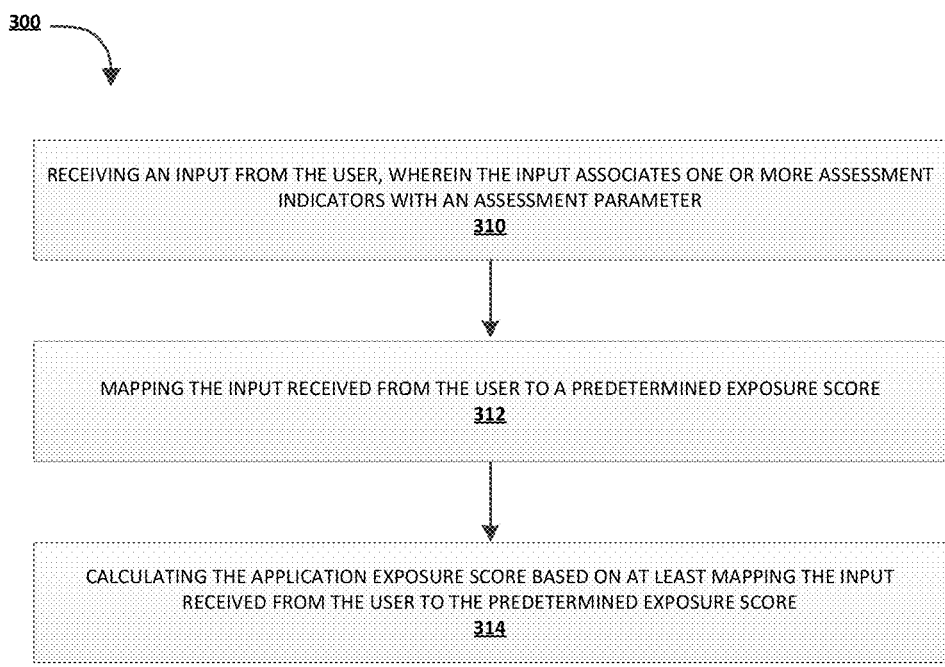
Figures 4A, 4B:
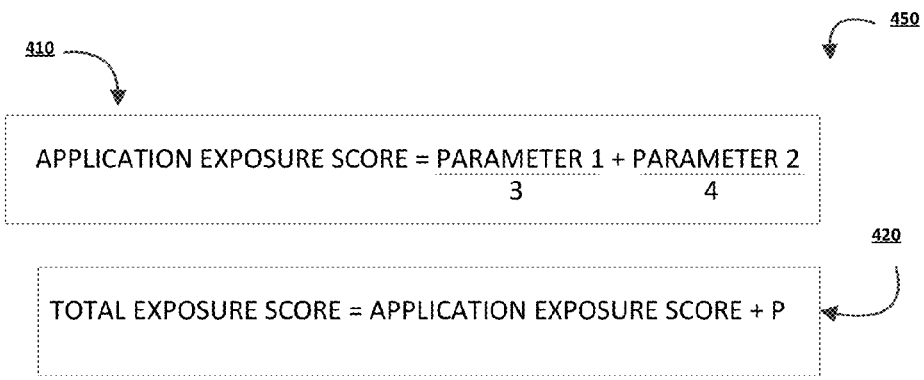
Figure 5:
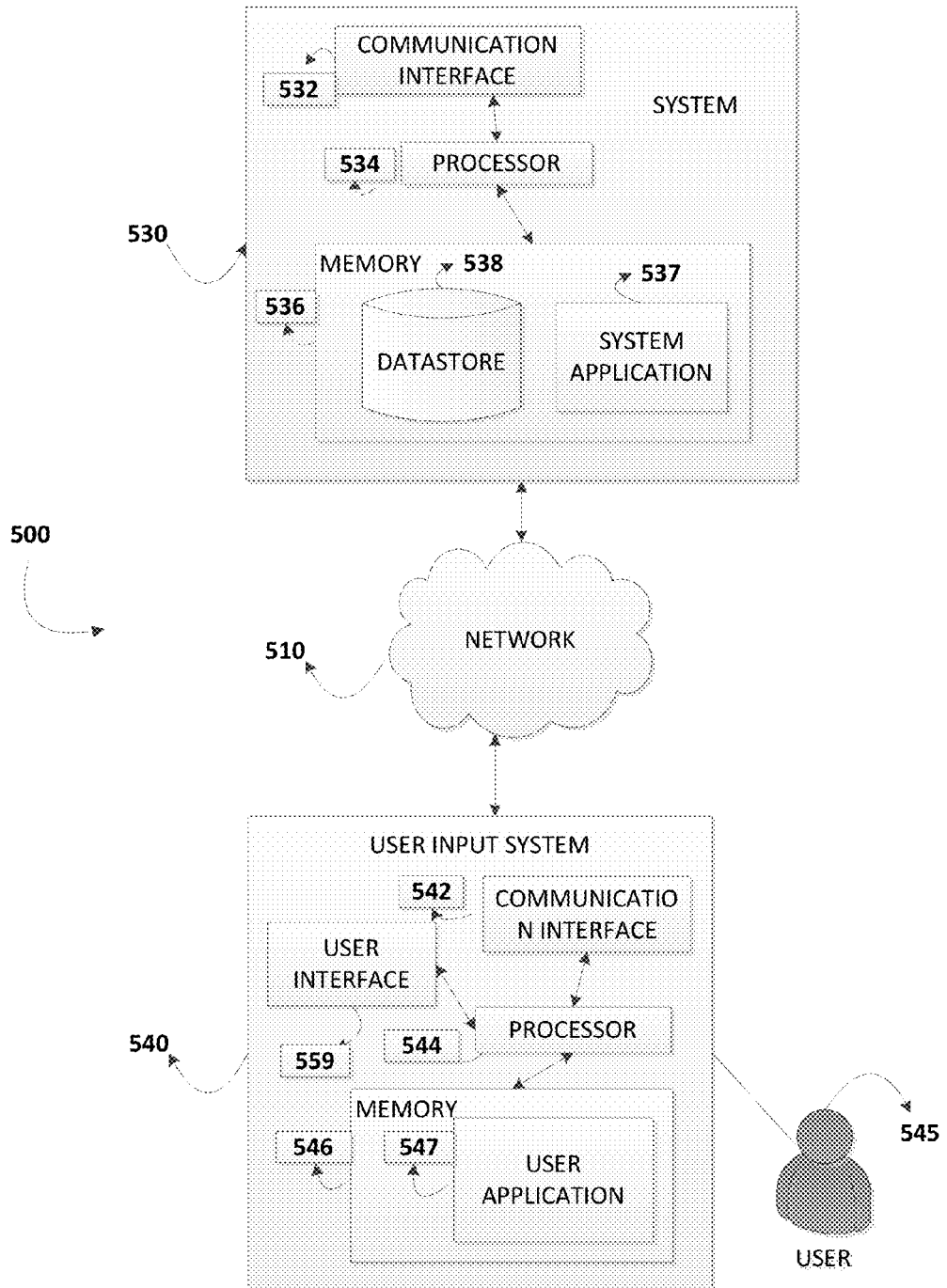

Having thus described embodiments of the invention in general terms, reference will now be made to the accompanying drawings, where:

FIG. 1 illustrates a high-level process flow of an exposure based application security testing system, in accordance with embodiments of the present invention;

FIG. 2 illustrates an exemplary embodiment of the assessment spreadsheet;

FIG. 3 illustrates a process flow for determining an application exposure score;

FIG. 4A illustrates an exemplary embodiment of an exposure score spreadsheet;

FIG. 4B illustrates an exemplary set of equations used to calculate the total exposure score;

FIG. 5 illustrates the system environment of the exposure based application security testing system, in accordance with embodiments of the present invention.

Figure 6A:
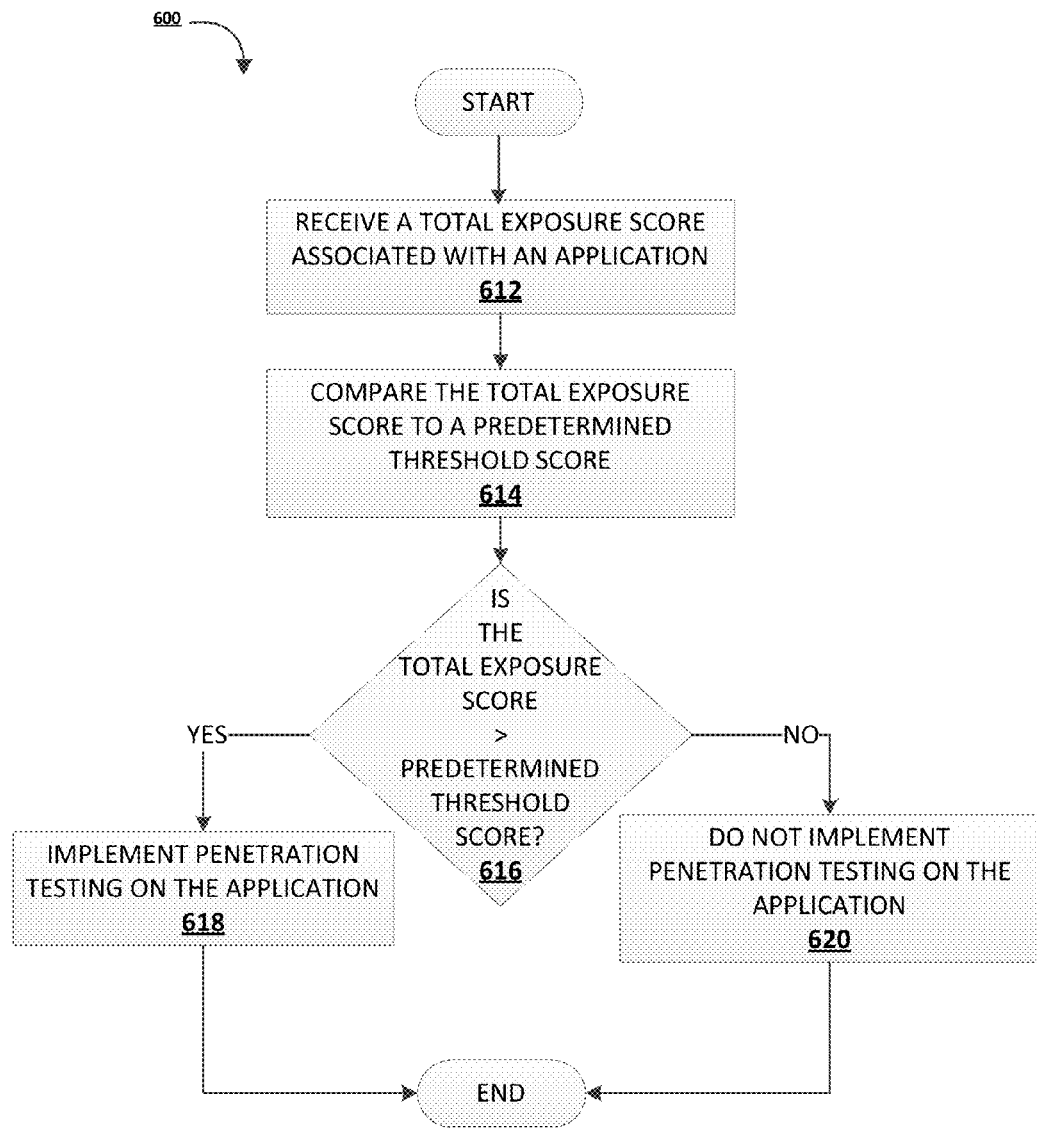

FIG. 6A illustrates a process flow chart for implementation of security testing on an application, in accordance with an embodiment of the present invention.

Figure 6B:
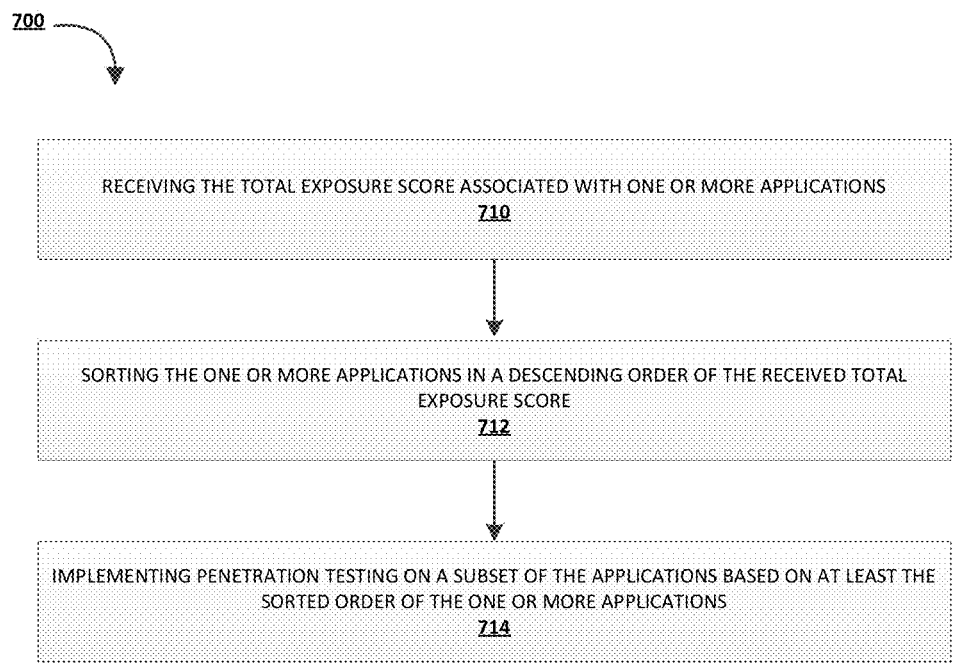

FIG. 6B illustrates a process flow chart for implementation of security testing on an application, in accordance with an embodiment of the present invention.

DETAILED DESCRIPTION OF AN EMBODIMENT OF THE PRESENT INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In some embodiments, an "entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a customer to establish an account with the entity. An "account" may be the relationship that the customer has with the entity. Examples of accounts include a deposit account, such as a transactional account (e.g. a banking account), a savings account, an investment account, a money market account, a time deposit, a demand deposit, a pre-paid account, a credit account, a non-monetary customer profile that includes only personal information associated with the customer, or the like. The account is associated with and/or maintained by an entity. In other embodiments, an "entity" may not be a financial institution.

In some embodiments, the "user" may be an account holder or a person who has an account (e.g. banking account, credit account, or the like) at the entity. In alternate embodiments, the "user" may be a buyer, a merchant (e.g. a business, a vendor, a service provider, or the like). The user may also be an agent (customer service representative, internal operations specialist, bank teller, account manager, or the like) associated with the entity, a system developer, an employee using the system under consideration, a system owner, or the like.

As used herein, an "application" may be anything as complex as a multi-tier web application down to an individual script. For the purposes of the analysis, it should be considered as any piece of executable code that can "stand on its own." This would include the aforementioned web application, a desktop application, a shared code library intended for reuse, or a script in some cases. An application may also be a project, wherein a project is an application (or set of applications) that belongs to one or more stakeholders. In some cases, a project may have a number of subcomponents that are individual applications, but all those pieces are assembled into a larger functioning unit. For the purposes of exposure assessment, a project is something that belongs to a particular project sponsor, that has its own exposure assessments, and that influences the exposure on the infrastructure and other applications.

Typically, security testing is used to evaluate application security by simulating an exposure assessment from external and internal factors. The process involves an active analysis of an application to uncover potential vulnerabilities, if any, in the application arising due to poor hardware and software configuration, both known and unknown software flaws, and/or operational weaknesses in the process or technical countermeasures. In response to uncovering potential vulnerabilities, a notification may be provided to the user to remedy the issue and ensure proper protection of the application. Effective security tests will couple this information with an accurate assessment of the potential impacts to the organization and outline a range of technical and procedural countermeasures to reduce unfavorable access. In some embodiments, security testing may be used to assess the magnitude of potential business and operational impacts of unfavorable access.

Although security testing is a beneficial practice, there are significant practical limitations to be considered. Ideally, security testing must be implemented on every application used in a business environment to obtain an accurate assessment of the application exposure. With finite resources, limited range, shortened time frame, and/or a targeted scope, security testing can get manually intensive, as every application requires individual assessment.

The present invention aims to overcome these disadvantages by performing an initial assessment of the application using a criteria triage by focusing on recognizing and understanding existing security measures, or security measures that may arise from business initiatives, strategic actions, and emerging external factors, and conducting security testing on a subset of the applications from at least an exposure and regulatory perspective. The initial assessment of the application using a criteria triage aims to provide a defensive process of mapping a holistic view of the security perspective across three main aspects of an application, namely, confidentiality, availability, and integrity while remaining adjustable as it relates to business functions, regulatory requirements, application dependencies, data exposure to the internet, and protective controls in place.

FIG. 1 shows a high level process flow of the system 100. As shown in block 110, the system is configured to access an application, wherein the application comprises an assessment parameter. In some embodiments, the assessment parameter may comprise one or more assessment indicators. In some other embodiments, each assessment parameter may include one or more sub-parameters. For example, the data sensitivity parameter may include sub-parameters such as highest security level data, application data content, PCI data, NPI process, or the like.

In one aspect, the received application may be associated with one or more other applications. In such cases, a user selection of the one or more assessment parameters is based on at least the association of the received application with one or more other applications. For example, enterprise application integration is the process of linking islands of automation or information silos such as supply chain management applications (for managing inventory and shipping), customer relationship management applications (for managing current and potential customers), business intelligence applications (for finding patterns from existing data from operations), and other types of applications (for managing data such as human resources data, health care, internal communications, or the like). In such cases, the user selection of an assessment parameter for (say) customer relationship management application is based on at least the association of the application with one or more other applications, as effects of exposure on the customer relationship management application may create dependences (up-stream or down-stream) on (say) supply chain management applications and/or business intelligence applications.

In some embodiments, the assessment indicators may be used to determine the impact of each assessment parameter in the process of recognizing and understanding existing issues or exposure that may arise from business initiatives, strategic actions, and emerging external factors. The present invention embraces an assessment triage comprising at least confidentiality, availability, and integrity as well as remaining flexible and adjustable as it relates to business functions, regulatory requirements and application dependencies, their data, exposure to the Internet and protective controls in place. In this way, the assessment triage provides a defensive process of mapping a holistic view of the assessment perspective. To manage exposure effectively, the assessment parameters must be clearly defined, proactively identified, and accurately measured. Proper assessment parameters and indicators focus on recognizing and understanding existing exposures, or exposures that may arise from business initiatives, strategic actions, and emerging external factors. In one aspect, these assessment parameters and indicators depend on the business need and may be unique for all applications.

In response to accessing the application, the system is configured to process the application, wherein processing the application comprises calculating an exposure score for the application based on at least one of the one or more assessment parameters and the one or more assessment indicators, as shown in block 112. In some embodiments, each assessment parameter may include one or more assessment indicators, as discussed herein. In one aspect, the system may be configured to enable the user association of one or more assessment indicators to an assessment parameter. In this way an exposure profile may be generated for each application and a total exposure score calculated.

In some embodiments, the system may be configured to determine whether the application qualifies for security testing based on at least the total exposure score, as shown in block 114. In some embodiments, determining whether the application qualifies for security testing comprises comparing the total exposure score to a predetermined threshold score.

In response to determining whether the application qualifies for security testing, the system is then configured to present the qualified application to the user to implement security testing, as shown in bloc 116. In one aspect, security testing may be applied on the application if the exposure score associated with the application is greater than a predetermined threshold score. In another aspect, security testing may be applied on a subset of application by sorting the applications based on at least their total assessment score.

FIG. 2 illustrates an exemplary embodiment of an assessment spreadsheet 200. Typically, an assessment spreadsheet may be used to develop an exposure profile for an application. In one aspect, the system may be configured to enable editing the assessment spreadsheet for periodic updates. In another aspect, the system may be configured to enable editing on selective parts of the assessment spreadsheet for periodic updates. In yet another aspect, the system may be configured to enable the assessment spreadsheet to be password protected to ensure access to only a subset of users in the entity. In yet another aspect, the system may be configured to enable selective parts of the assessment spreadsheet to be password protected.

As illustrated in FIG. 2, the assessment spreadsheet may comprise at least an assessment parameter 202, assessment sub-parameter 204, assessment indicators 208, and comments 210. In some embodiments, for every assessment sub-parameter 204, the system may enable a user selection of one or more assessment indicators 208 based on at least the user's experience with the application, currently known issues, and a predictable future assessment, resulting in a profile for every assessment parameter 202. In one aspect, the assessment indicators 208 may be used to determine the impact of each assessment parameter 202 in the process of recognizing and understanding existing issues or exposure that may arise from business initiatives, strategic actions, and emerging external factors. For example, consider an assessment spreadsheet for an application having an assessment parameter 202 "data sensitivity", an assessment sub-parameter 204 "SSN", and assessment indicators 208, "confidential", "integrity", "availability". In such cases, the user may choose to associate the "SSN" with both "confidential" and "integrity" with an "x", wherein the "x" may be used to implicitly state that the exposure of "SSN" may affect the confidentiality between a customer and an entity, and compromise the integrity of the application. In this way, an exposure profile may be developed for every application. In some embodiments, the assessment spreadsheet may comprise a comment 210 section to include additional comments and rationale for every association of an assessment 208 indicator with an assessment parameter 202. In some other embodiments, the assessment spreadsheet may comprise an application identifier as part of one of the assessment indicators 208 which in some cases may be required, but not rated as part of an exposure profile.

FIG. 3 presents a process flow for determining an application exposure score 300. As shown in block 310, the system is configured to receive an input from the user, wherein the input associates one or more assessment indicators 208 with an assessment parameter 202. For example, consider an assessment spreadsheet for an application having an assessment parameter 202 "criticality", an assessment sub-parameter 204 "application integration", and assessment indicators 208, "confidential", "integrity", "availability". In such cases, the user may associate the "application" with "confidential", "integrity", and "availability" with an "x", wherein the "x" may be used to implicitly state that the exposure of an application integrated with one or more other application may be detrimental as integration increases the exposure of complex attack vectors, access to other applications, or the like. In some embodiments, the system is configured to leverage the application inventory tool to associate assessment indicators with the one or more assessment parameter/sub-parameter, wherein the application inventory tool comprises factual information associated with the application and the data associated with the application under review. In response to receiving the input from the user, the system may then be configured to map the input received to a predetermined exposure score, as shown in block 312. In one aspect, the predetermined exposure score may be based on at least the impact of the assessment parameter on the application. For example, for the assessment parameter "highest security level data", the exposure scores vary according to the level of security. Accordingly, sensitive data with a higher level of security will have a higher exposure score, while data available to the general public will have a lower exposure score (confidential=10, proprietary=5, public=0). In one aspect, the predetermined exposure score may be used to define a relationship between the one or more assessment indicators and the assessment parameter. For example, the predetermined exposure score may be used to indicate a linear relationship between the number of external users with access to the application and the exposure assessment parameter, stating the probability of exposure of an application may increase with an increase in the number of external users with access to the application. In some embodiments, the system may be configured to take protective controls in place into consideration. Typically, these protective controls associated with an application may substantially reduce application exposure. For example, an application with a web firewall (WAF) installation may have a predetermined exposure score of −2 (negative two) indicating a higher tolerance to exposure, while an application with no firewall protection may have a predetermined exposure score of 2 indicating a lower tolerance to exposure. In response to mapping the input received from the user to the predetermined exposure score, the system may be configured to calculate the application exposure score, as shown in block 314.

FIG. 4A presents an exemplary embodiment of an exposure score spreadsheet 400. In one aspect, the exposure score spreadsheet may be used as a key to map the input received from the user associating an assessment parameter to one or more assessment indicators. In some embodiments, the exposure score spreadsheet may comprise an assessment parameter 202, assessment sub-parameters 204, and exposure score 402. In one exemplary embodiment, an assessment parameter 202 "exposure" with an assessment sub-parameter 204

"amount of internal users", may have an exposure score 402 associated with the number of internal users who have access to the application. In such cases, an exposure score of 10 can be assigned to ten or more users, an exposure score of 7 can be assigned sub-parameter is the number of internal users is between six and ten, an exposure score of 5 can be assigned to the sub-parameter if the number of internal users is between one and five, and an exposure score of 0 can be assigned to the sub-parameter if the number of internal users is zero. In this example, the exposure score indicates a linear relationship between the number of internal users and the exposure assessment parameter.

FIG. 4B presents an exemplary set of equations used to calculate the total exposure score 450. In one aspect, the application exposure score can be calculated based on at least the mapping of the input received from the user and the exposure score spreadsheet, presented in FIG. 4A, as shown by equation 410. In one aspect, calculating the application exposure score comprises summing the mapped score of the assessment parameter based on at least a normalization of the mapped score with the one or more sub-parameters 204 associated with the assessment parameter 202. In some embodiments, the total exposure score may be calculated as the sum of the application exposure score and the mapped exposure score associated with the protective controls in place as shown in equation 420.

FIG. 5 presents an exemplary block diagram of the system environment 500 for implementing the process flow described in FIG. 1 in accordance with embodiments of the present invention. As illustrated, the system environment 500 includes a network 510, a system 530, and a customer input system 530. Also shown in FIG. 5 is a customer of the customer input system 530. The customer input system 530 may be a mobile device or other non-mobile computing device. The customer may be a person who uses the customer input system 430 to execute a customer application 547. The customer application 547 may be an application to communicate with the system 530, perform a transaction, input information onto a customer interface presented on the customer input system 530, or the like. The customer application 547 and/or the system application 537 may incorporate one or more parts of any process flow described herein.

As shown in FIG. 5, the system 530, and the customer input system 530 are each operatively and selectively connected to the network 510, which may include one or more separate networks. In addition, the network 510 may include a telecommunication network, local area network (LAN), a wide area network (WAN), and/or a global area network (GAN), such as the Internet. It will also be understood that the network 510 may be secure and/or unsecure and may also include wireless and/or wired and/or optical interconnection technology.

The customer input system 530 may include any computerized apparatus that can be configured to perform any one or more of the functions of the customer input system 530 described and/or contemplated herein. For example, the customer may use the customer input system 530 to transmit and/or receive information or commands to and from the system 530. In some embodiments, for example, the customer input system 530 may include a personal computer system (e.g. a non-mobile or non-portable computing system, or the like), a mobile computing device, a personal digital assistant, a mobile phone, a tablet computing device, a network device, and/or the like. As illustrated in FIG. 5, in accordance with some embodiments of the present invention, the customer input system 430 includes a communication interface 532, a processor 534, a memory 536 having an customer application 547 stored therein, and a customer interface 549. In such embodiments, the communication interface 532 is operatively and selectively connected to the processor 534, which is operatively and selectively connected to the customer interface 549 and the memory 536. In some embodiments, the customer may use the customer application 547 to execute processes described with respect to the process flows described herein. Specifically, the customer application 547 executes the process flow described in FIG. 1 and FIG. 3.

Each communication interface described herein, including the communication interface 532, generally includes hardware, and, in some instances, software, that enables the customer input system 530, to transport, send, receive, and/or otherwise communicate information to and/or from the communication interface of one or more other systems on the network 510. For example, the communication interface 532 of the customer input system 530 may include a wireless transceiver, modem, server, electrical connection, and/or other electronic device that operatively connects the customer input system 530 to another system such as the system 530. The wireless transceiver may include a radio circuit to enable wireless transmission and reception of information. Additionally, the customer input system 530 may include a positioning system. The positioning system (e.g. a global positioning system (GPS), a network address (IP address) positioning system, a positioning system based on the nearest cell tower location, or the like) may enable at least the customer input system 530 or an external server or computing device in communication with the customer input system 530 to determine the location (e.g. location coordinates) of the customer input system 530.

Each processor described herein, including the processor 534, generally includes circuitry for implementing the audio, visual, and/or logic functions of the customer input system 530. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the customer application 547 of the memory 536 of the customer input system 530.

Each memory device described herein, including the memory 536 for storing the customer application 547 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 5, the memory 536 includes the customer application 547. In some embodiments, the customer application 547 includes an interface for communicating with, navigating, controlling, configuring, and/or using the customer input system 530. In some embodiments, the customer application 547 includes computer-executable program code portions for instructing the processor 534 to perform one or more of the functions of the customer application 547 described and/or contemplated herein. In some embodiments, the customer application 547 may include and/or use one or more network and/or system communication protocols.

Also shown in FIG. 5 is the customer interface 549. In some embodiments, the customer interface 549 includes one or more output devices, such as a display and/or speaker, for presenting information to the customer. In some embodiments, the customer interface 549 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the customer. In some embodiments, the customer interface 549 includes the input and display devices of a mobile device, which are operable to receive and display information.

FIG. 5 also illustrates a system 530, in accordance with an embodiment of the present invention. The system 530 may refer to the "apparatus" described herein. The system 530 may include any computerized apparatus that can be configured to perform any one or more of the functions of the system 530 described and/or contemplated herein. In accordance with some embodiments, for example, the system 530 may include a computer network, an engine, a platform, a server, a database system, a front end system, a back end system, a personal computer system, and/or the like. Therefore, the system 530 may be a server managed by the entity. The system 530 may be located at the facility associated with the entity or remotely from the facility associated with the entity. In some embodiments, such as the one illustrated in FIG. 5, the system 530 includes a communication interface 532, a processor 534, and a memory 536, which includes a system application 537 and a structured database 538 stored therein. As shown, the communication interface 532 is operatively and selectively connected to the processor 534, which is operatively and selectively connected to the memory 536.

It will be understood that the system application 537 may be configured to implement any one or more portions of the various customer interfaces and/or process flow described herein. The system application 537 may interact with the customer application 547. It will also be understood that, in some embodiments, the memory includes other applications. It will also be understood that, in some embodiments, the system application 537 is configured to communicate with the structured database 538, the customer input system 530, or the like.

It will be further understood that, in some embodiments, the system application 537 includes computer-executable program code portions for instructing the processor 534 to perform any one or more of the functions of the system application 537 described and/or contemplated herein. In some embodiments, the system application 537 may include and/or use one or more network and/or system communication protocols.

In addition to the system application 537, the memory 536 also includes the structured database 538. As used herein, the structured database 538 may be one or more distinct and/or remote databases. In some embodiments, the structured database 538 is not located within the system and is instead located remotely from the system. In some embodiments, the structured database 538 stores information or data described herein.

It will be understood that the structured database 538 may include any one or more storage devices, including, but not limited to, datastores, databases, and/or any of the other storage devices typically associated with a computer system. It will also be understood that the structured database 538 may store information in any known way, such as, for example, by using one or more computer codes and/or languages, alpha-numeric character strings, data sets, figures, tables, charts, links, documents, and/or the like. Further, in some embodiments, the structured database 538 may include information associated with one or more applications, such as, for example, the system application 537. It will also be understood that, in some embodiments, the structured database 538 provides a substantially real-time representation of the information stored therein, so that, for example, when the processor 534 accesses the structured database 538, the information stored therein is current or substantially current.

It will be understood that the embodiment of the system environment illustrated in FIG. 5 is exemplary and that other embodiments may vary. As another example, in some embodiments, the system 530 includes more, less, or different components. As another example, in some embodiments, some or all of the portions of the system environment 500 may be combined into a single portion. Likewise, in some embodiments, some or all of the portions of the system 530 may be separated into two or more distinct portions.

In addition, the various portions of the system environment 500 may be maintained for and/or by the same or separate parties. It will also be understood that the system 530 may include and/or implement any embodiment of the present invention described and/or contemplated herein. For example, in some embodiments, the system 530 is configured to implement any one or more of the embodiments of the process flows described and/or contemplated herein in connection any process flow described herein. Additionally, the system 430 or the customer input system 530 is configured to initiate presentation of any of the customer interfaces described herein.

FIG. 6A presents a process flow chart for implementation of security testing on an application 600. As shown in block 612, the system may be configured to receive a total exposure score as calculated in FIG. 4B. In response to receiving the total exposure score, the system may be configured to compare the total exposure score received to a predetermined threshold score, as shown in block 614. In one aspect, the predetermined score may be a standard threshold score against which all of the exposure scores are calculated across the system platform/environment. In another aspect, the predetermined threshold score may be based on a business need and vary from one application to another. For example, an application dealing with critical financial transaction data may have a higher threshold score than an application dealing with receipts. In other embodiments, the system may be configured to sort the applications (ascending order, descending order, or the like) based on their individual exposure scores.

In response to comparing the total exposure score received to the predetermined threshold score, the system may be configured to determine whether the total exposure is greater than the predetermined threshold score, as illustrated in block 616. If the total exposure score is greater than the predetermined threshold score, then the system may be configured to implement security testing on the application, as shown in block 618. If the total exposure score is not greater than the predetermined threshold score, then the system may be configured to not implement security testing on the application, as shown in block 620.

FIG. 6B presents a process flow for implementing security testing 700. As shown in block 710, the system may be configured to receive the total exposure score associated with one or more applications. In response to receiving the total exposure scores, the system may be then configured to sort the one or more applications in a descending order of the received total exposure score, as shown in block 712. In response to sorting the applications, security testing may be applied in a top-down approach to a subset of the applications, wherein the top-down approach comprises an implementation of security testing on applications in the descending order of their total exposure score, as shown in block 714.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. An apparatus for an exposure based application security testing system, the apparatus comprising:
   a memory;
   a processor; and
   a module stored in memory and comprising instruction code that is executable by the processor, and configured to cause the processor to:
   access an application, wherein the application comprises an assessment parameter, wherein the assessment parameter comprises one or more assessment sub-parameters, wherein the one or more assessment sub-parameters comprise one or more assessment indicators;
   receive an input from a user, wherein the input from the user associates the one or more assessment indicators with the assessment parameter, wherein the assessment parameter is selected by the user based on at least an association of the application with one or more other applications;
   map the input received from the user to a predetermined exposure score resulting in a mapped score;
   calculate an application exposure score based on at least the mapped score thereby creating an exposure profile for the application, wherein calculating the application exposure score comprises summing the mapped score of the assessment parameter based on at least a normalization of the mapped score with the one or more sub-parameters associated with the assessment parameter;
   process the application, wherein processing the application comprises calculating a total exposure score for the application based on at least the application exposure score and a protective control score, wherein calculating the protective control score is based on at least an existence of a protective security firewall to limit unauthorized use and access to the application, wherein the total exposure score is a summation of the application exposure score and the protective control score;
   determine whether the application qualifies for security testing based on at least the calculated total exposure score;
   compare the total exposure score to a predetermined threshold score;
   determine whether the total exposure score is greater than the predetermined threshold score; and
   initiate a presentation of the application to the user to implement security testing based on at least determining whether the total exposure score is greater than the predetermined threshold score.

2. The apparatus of claim 1, wherein the module is further configured to enable a user selection of the predetermined exposure score.

3. The apparatus of claim 1, wherein a user selection of the predetermined exposure score is not unique to an assessment parameter.

4. The apparatus of claim 1, wherein a user selection of the predetermined exposure score is not unique to an assessment sub-parameter.

5. The apparatus of claim 1, wherein a user selection of the predetermined exposure score is unique to an assessment parameter.

6. The apparatus of claim 1, wherein a user selection of the predetermined exposure score is unique to an assessment sub-parameter.

7. The apparatus of claim 1, wherein the module is further configured to enable a user selection of the predetermined threshold score.

8. The apparatus of claim 1, wherein a user selection of the predetermined threshold score is unique to the application.

9. The apparatus of claim 1, wherein a user selection of the predetermined threshold score is not unique to the application.

10. The apparatus of claim 1, the module is further configured to:
    receive the total exposure score associated with one or more applications;
    sort the one or more applications based on at least the total exposure score; and
    initiate a presentation of the one or more applications to the user to implement security testing based on at least the sorted order of the one or more applications.

11. The apparatus of claim 10, wherein the one or more applications are sorted in descending order based on at least the total exposure score.

12. The apparatus of claim 11, wherein security testing is implemented on the one or more applications based on at least the descending order of the total exposure score.

13. The apparatus of claim 10, wherein security testing is implemented on a subset of the one or more applications based on at least the sorted order.

14. A method for exposure based security testing via a transfer network, the method comprising:
    accessing an application, using a computing device processor, wherein the application comprises an assessment parameter, wherein the assessment parameter comprises one or more assessment sub-parameters, wherein the one or more assessment sub-parameters comprise one or more assessment indicators;
    receiving, using a computing device processor, an input from a user, wherein the input from the user associates the one or more assessment indicators with the assessment parameter, wherein the assessment parameter is selected by the user based on at least an association of the application with one or more other applications;
    mapping, using a computing device processor, the input received from the user to a predetermined exposure score resulting in a mapped score;
    calculating, using a computing device processor, an application exposure score based on at least the mapped score thereby creating an exposure profile for the application, wherein calculating the application exposure score comprises summing the mapped score of the assessment parameter based on at least a normalization of the mapped score with the one or more sub-parameters associated with the assessment parameter;
    processing the application, using a computing device processor, wherein processing the application comprises calculating a total exposure score for the application based on at least the application exposure score and a protective control score, wherein calculating the protective control score is based on at least an existence of a protective security firewall to limit unauthorized use and access to the application, wherein the total exposure score is a summation of the application exposure score and the protective control score;

determining, using a computing device processor, whether the application qualifies for security testing based on at least the calculated total exposure score;

comparing, using a computing device processor, the total exposure score to a predetermined threshold score;

determining, using a computing device processor, whether the total exposure score is greater than the predetermined threshold score; and initiating, using a computing device processor, a presentation of the application to the user to implement security testing based on at least determining whether the total exposure score is greater than the predetermined threshold score.

15. A computer program product for a travel flag communication system via a transfer network, the computer program product comprising a non-transitory computer-readable medium comprising code causing a first apparatus to:

access an application, wherein the application comprises an assessment parameter, wherein the assessment parameter comprises one or more assessment sub-parameters, wherein the one or more assessment sub-parameters comprise one or more assessment indicators;

receive an input from a user, wherein the input from the user associates the one or more assessment indicators with the assessment parameter, wherein the assessment parameter is selected by the user based on at least an association of the application with one or more other applications;

map the input received from the user to a predetermined exposure score resulting in a mapped score;

calculate an application exposure score based on at least the mapped score thereby creating an exposure profile for the application, wherein calculating the application exposure score comprises summing the mapped score of the assessment parameter based on at least a normalization of the mapped score with the one or more sub-parameters associated with the assessment parameter;

process the application, wherein processing the application comprises calculating a total exposure score for the application based on at least the application exposure score and a protective control score, wherein calculating the protective control score is based on at least an existence of a protective security firewall to limit unauthorized use and access to the application, wherein the total exposure score is a summation of the application exposure score and the protective control score;

determine whether the application qualifies for security testing based on at least the calculated total exposure score;

compare the total exposure score to a predetermined threshold score;

determine whether the total exposure score is greater than the predetermined threshold score; and initiate a presentation of the application to the user to implement security testing based on at least determining whether the total exposure score is greater than the predetermined threshold score.

\* \* \* \* \*